United States Patent
Villasante Marcos et al.

(10) Patent No.: US 11,924,051 B2
(45) Date of Patent: Mar. 5, 2024

(54) METHOD AND SYSTEM FOR ESTIMATING NETWORK PERFORMANCE USING MACHINE LEARNING AND PARTIAL PATH MEASUREMENTS

(71) Applicant: Telefonaktiebolaget LM Ericsson (publ), Stockholm (SE)

(72) Inventors: Carlota Villasante Marcos, Madrid (ES); Marc Molla, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/762,925

(22) PCT Filed: May 20, 2020

(86) PCT No.: PCT/IB2020/054799
§ 371 (c)(1),
(2) Date: Mar. 23, 2022

(87) PCT Pub. No.: WO2021/074701
PCT Pub. Date: Apr. 22, 2021

(65) Prior Publication Data
US 2022/0385543 A1    Dec. 1, 2022

(30) Foreign Application Priority Data

Oct. 18, 2019 (EP) .................................. 19382912

(51) Int. Cl.
*G06F 15/173* (2006.01)
*H04L 41/147* (2022.01)
(Continued)

(52) U.S. Cl.
CPC ............ *H04L 41/147* (2013.01); *H04L 41/16* (2013.01); *H04L 43/08* (2013.01)

(58) Field of Classification Search
None
See application file for complete search history.

(56) References Cited

U.S. PATENT DOCUMENTS 6,839,754 B2 * 1/2005 Nowak ................... H04L 43/50
714/48
11,009,836 B2 * 5/2021 Hoffmann .......... G05B 13/0265
(Continued)

FOREIGN PATENT DOCUMENTS

WO    2015/103538 A1    7/2015

OTHER PUBLICATIONS

Igai et al., "A Simple Link-Utilization Estimation Scheme Based on RTT Measurement", 2011 1st International Symposium on Access Spaces (ISAS), IEEE-ISAS 2011, Jun. 2011, pp. 266-270.
(Continued)

*Primary Examiner* — Phuoc H Nguyen
(74) *Attorney, Agent, or Firm* — NICHOLSON DE VOS WEBSTER & ELLIOTT LLP

(57) ABSTRACT

Embodiments of the disclosed techniques include methods for estimating network performance of a path between a terminal device and an application server through a core network. In one embodiment, the method comprises measuring network performance of a portion of the path within the core network to obtain one or more partial network performance measurements in a first period, obtaining one or more end-to-end measurements of the path in the first period, where the end-to-end measurements are values of an end-to-end performance indicator; and estimating one or more values of the end-to-end performance indicator in a second period after the first period, using partial network performance measurements in the second period and the machine learning function.

20 Claims, 19 Drawing Sheets

(51) Int. Cl.
*H04L 41/16* (2022.01)
*H04L 43/08* (2022.01)

(56) References Cited

U.S. PATENT DOCUMENTS

| | | | | |
|---|---|---|---|---|
| 11,366,842 | B1* | 6/2022 | Swaminathan | G06F 17/18 |
| 2015/0195171 | A1 | 7/2015 | Mermoud et al. | |
| 2018/0040064 | A1* | 2/2018 | Grigg | G06Q 30/0244 |
| 2018/0242178 | A1* | 8/2018 | Barton | H04W 24/08 |
| 2019/0339688 | A1* | 11/2019 | Cella | H04L 1/18 |
| 2019/0364492 | A1* | 11/2019 | Azizi | H04W 48/16 |
| 2023/0022316 | A1* | 1/2023 | Lang | A61B 5/7267 |

OTHER PUBLICATIONS

Jacobson et al., "Congestion Avoidance and Control", ACM SIGCOMM Computer Communication Review, vol. 18, No. 4, Available Online at <https://ee.lbl.gov/papers/congavoid.pdf>, Nov. 1988, pp. 1-25.
Nunes et al., "A Machine Learning Framework for TCP Round-trip Time Estimation", EURASIP Journal on Wireless Communications and Networking 2014, vol. 47, 2014, pp. 1-22.
Romirer-Maierhofer et al., "Network-Wide Measurements of TCP RTT in 3G", TMA 2009, LNCS 5537, 2009, pp. 17-25.
Samson, Judith, "Predicting Round Trip Time for the TCP Protocol", Advanced Machine Learning, CMPS 290c, Jun. 13, 2013, pp. 1-13.
Valles, Damian, "IP Packet Loss and RTT Calculation Simulation Using Low-Cost Embedded Real-Time Systems", Proceedings of the 2018 International Conference on Embedded Systems, Cyber-Physical Systems, & Applications, ESCS'18, 2018, pp. 54-57.
Yang et al., "Predicting Internet End-to-End Delay: An Overview", Proceedings of the Thirty-Sixth Southeastern Symposium on System Theory, Mar. 14, 2004, pp. 210-214.

* cited by examiner

METHOD AND SYSTEM FOR ESTIMATING NETWORK PERFORMANCE USING MACHINE LEARNING AND PARTIAL PATH MEASUREMENTS

CROSS-REFERENCE TO RELATED APPLICATIONS

This application is a National stage of International Application No. PCT/IB2020/054799, filed May 20, 2020, which is a continuation of Application No. EP 19382912.4, filed Oct. 18, 2019, which are hereby incorporated by reference.

TECHNICAL FIELD

Embodiments of the invention relate to the field of networking; and more specifically, to estimate network performance using machine learning and partial path measurements.

BACKGROUND ART

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The future fifth generation (5G) network is designed for fulfilling a set of technical key performance indicators (KPIs), defined by the 5G Public Private Partnership (5GPP). Additionally, the new virtualization techniques allow to define the concept of network slicing, where telecom/network operators will be able to provide logical network to their business clients to meet specific requirements, e.g., Ultra Reliability Low Latency Communications (URLLC) services. All these new features are creating a big expectation in some vertical industries that see in the future 5G an opportunity for changing their business. A typical 5G use case is to set up paths between terminal devices (e.g., a user equipment (UE)) and service providers (e.g., a service/application server) through a core network (e.g., a 5G network) and take advantage of the promised low latency in the core network and proficient computing/bandwidth resources at the edge/server computing environments. For these applications, it is critical to measure the network latency and the network reliability and for the telecom/network operator, to guarantee the promised network performance. Yet while the telecom/network operator can measure network performance under its control (e.g., the core network), it often does not have visibility to the edge and server computing environments because they are often managed by third parties. It is challenging to determine the network performance end-to-end in these applications.

SUMMARY

Embodiments of the disclosed techniques may use machine learning (ML) methods to estimate the latency key performance indicators (KPI) in different levels: ICMP ping, TCP RTT, HyperText Transfer Protocol (HTTP) response time, and service response time. For ICMP and ping, we introduce the estimation of one-way delay (OWD). Additionally, in the HTTP and Service response time measurements we introduce the kind of application that the end user is using in order to better estimate the latency experienced by the user.

The machine learning (ML) models are trained with the information gathered in the core network. While the measurements in the core network are for only a partial path, embodiments of the disclosed techniques estimate the values for end-to-end network performance based on known partial path information. The ML models may be trained using the following: (1) a supervised algorithm, where we gather from the network the required information (features) as well as the latency measurements obtained from external systems; and/or (2) a deep reinforcement learning agent for training the model in a live network.

Embodiments of the disclosed techniques include methods for estimating network performance of a path between a terminal device and an application server through a core network. In one embodiment, the method comprises measuring network performance of a portion of the path within the core network to obtain one or more partial network performance measurements in a first period, obtaining one or more end-to-end measurements of the path in the first period, where the end-to-end measurements are values of an end-to-end performance indicator; and estimating one or more values of the end-to-end performance indicator in a second period after the first period, using partial network performance measurements in the second period and the machine learning function.

Embodiments of the disclosed techniques include electronic devices for estimating network performance of a path between a terminal device and an application server through a core network. In one embodiment, an electronic device comprises a processor and non-transitory machine-readable storage medium storing instructions, which when executed by the processor, are capable of causing the electronic device to perform the following: measuring network performance of a portion of the path within the core network to obtain one or more partial network performance measurements in a first period, obtaining one or more end-to-end measurements of the path in the first period, where the end-to-end measurements are values of an end-to-end performance indicator; and estimating one or more values of the end-to-end performance indicator in a second period after the first period, using partial network performance measurements in the second period and the machine learning function.

Embodiments of the disclosed techniques include non-transitory machine-readable storage media for estimating network performance of a path between a terminal device and an application server through a core network. In one embodiment, the non-transitory machine-readable storage medium storing instructions, which when executed by the processor, are capable of causing the electronic device to perform the following: measuring network performance of a portion of the path within the core network to obtain one or more partial network performance measurements in a first period, obtaining one or more end-to-end measurements of the path in the first period, where the end-to-end measurements are values of an end-to-end performance indicator;

and estimating one or more values of the end-to-end performance indicator in a second period after the first period, using partial network performance measurements in the second period and the machine learning function.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
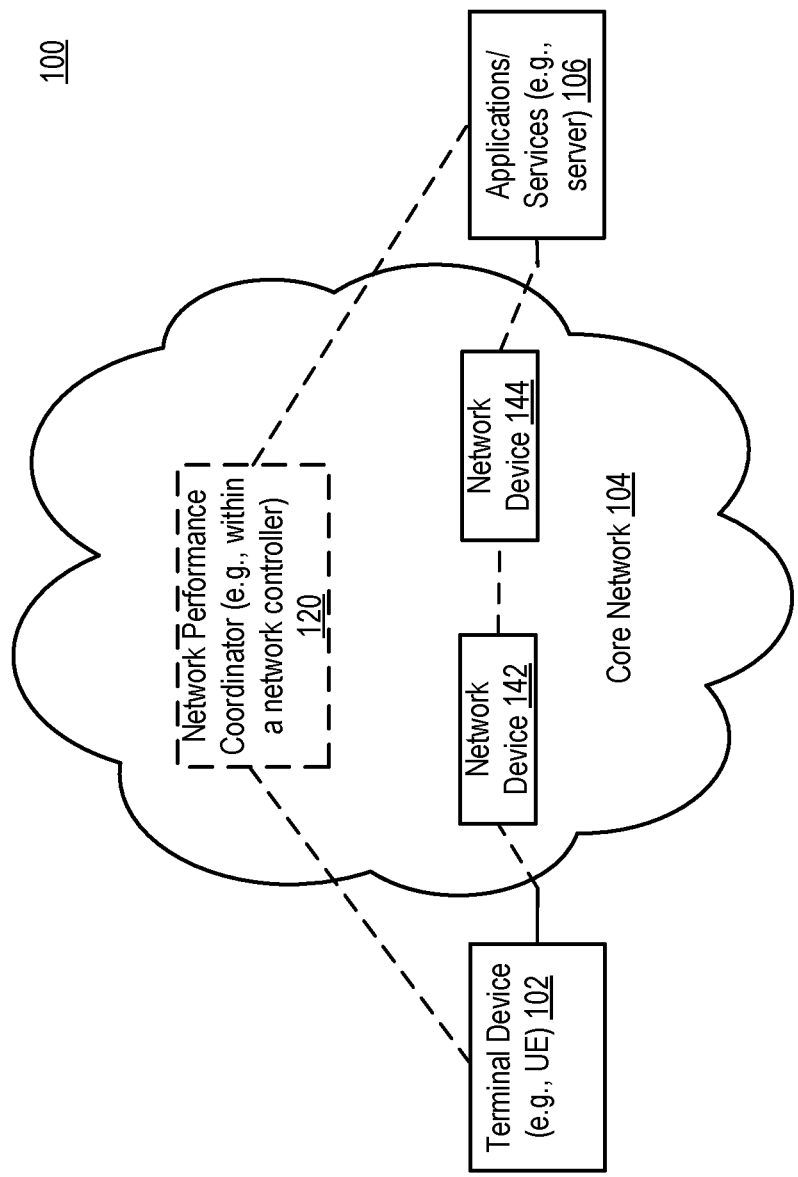
FIG. 1 illustrates a network environment per some embodiments.

The following description describes methods and systems for estimating network performance using machine learning and partial path measurements in a communication network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

Currently, all efforts for measuring the network latency can be classified in two methods: (1) the ones defined in 5GPP, where the latency is measured in an isolate laboratory test using Internet Control Message Packet (ICMP) packets, and (2) performing the measurement of the latency from the end-user equipment (UE), based on ICMP messages or on calculating Transport Control Protocol (TCP) Round Trip Time (RTT).

Estimating the TCP RTT is important in the TCP protocol, as the estimation impacts directly in the TCP timer's setup and for that, in the performance of the protocol in terms of throughput, packet loss, and number of retransmissions (efficiency). The current standard algorithm for estimating the RTT, called Jacobson-Karels algorithm, uses measurements of the TCP RTT and the standard deviation of the measured RTT as input for estimating the flow RTT and to set the Retransmission Time Out (RTO). The algorithm is known and used in TCP implementations.

Embodiments of the disclosure improve the estimation of RTT by using machine learning techniques with relevant improvements in the TCP protocol efficiency. Additionally, TCP RTT can be used as an indicator for other features (e.g., for predicting link utilization).

Machine learning (ML) is a scientific discipline that explores the study and application of algorithms that can learn from data. Such algorithms operate by building a model based on inputs and using that to make estimations, predictions, or decisions, rather than following only explicitly programmed instructions.

Machine learning techniques for key performance indicator (KPI) estimation can be based on behavioral characteristics from protocols and flows, such as TCP window size, ports, Internet Protocol (IP) address, packet size distribution, time between packets, payload bit level statistics, etc. Supervised training of machine learning model allows embodiments to train the model based on previous measurements in order to increase the accuracy of the estimations. Deep reinforcement learning is a technique to create machine learning models using real-time information obtained by the ML agent.

There currently exist certain challenge(s). We have encountered several problems regarding the existing solutions. For example, the current solution to measure the latency is on an end-to-end basis, from a User Equipment (UE) to an application server. Yet the end-to-end measurements are usually out of the scope of the network operators since third parties often control the UE and/or the application server. Additionally, the latency is usually based on the measurement of a ping. Such measurements are for Internet Control Message Packet (ICMP) traffic and they do not consider the TCP buffering time, and the measurement packet has a small packet size (32 Bytes) and it measures the two-way latency. It is impossible to distinguish the uplink latency from the downlink latency. Furthermore, the techniques to measure this KPI from the network only calculates partially the two-way latency. For example, TCP RTT allows us to know the downlink latency of the access network and the uplink latency of the data network side. Finally, no current solutions are able to measure a service response time.

Certain aspects of the present disclosure and their embodiments may provide solutions to these or other challenges. For example, one embodiment uses a machine learning method to measure in the network 5G key performance indicators as the latency, reliability, and response time of end-user services.

In one embodiment, partial measurements of a performance indicator (e.g., delay, response time, and percentage/rate of traffic complying with a delay/response time requirement) are made in a core, and end-to-end measurements of the performance indicator are also made from a terminal device. The partial measurements and the end-to-end measurements of the performance indicator are fed to a machine learning model to train the coefficients for the machine learning model. The coefficients are then used to estimate future end-to-end values of the performance indicator. In one embodiment, a plurality of performance indicators is used to train the machine learning model. The measurements of the performance indicator may be performed at different network conditions (e.g., congested, normal operation)

Certain embodiments may provide one or more of the following technical advantage(s). The main advantage of the proposed solution is that it provides a measurement of the end-to-end one-way latency from the 5G core network. This allows the network operators to have a network slice KPIs that can be used for checking in real time their service level agreements (SLAs) with the end-users.

By introducing the response time measurements, embodiments of the disclosed techniques report a more accurate estimation of the latency experimented by the end-user. The embodiments of the disclosed techniques give the network operators the capability to determine end-to-end network performance of a service/application when it has no visibility of the end-to-end network performance on its own. Through machine learning, the network operators may estimate the end-to-end network performance. The network operators may also adjust its estimation through updating the coefficients of the machine learning functions. The adjustment allows the estimation to remain accurate, thus maintains the agreed upon SLAs with customers/clients/application developers/service providers.

1. Network Environment

Embodiments of the invention operate in a network environment such as the one shown in FIG. 1.

A network 100 includes a terminal device 102 (e.g., a customer of the network 100), and the terminal device may be a UE. The terminal device 102 may be the wireless devices discussed herein below (e.g., the ones relating to FIG. 9). The network 100 includes applications/services (which may be provided through an application server/computing device, which may be a network device) 106, which may be provided by the network operator of the network 100 or a third party using the network 100 (thus another customer of network). The network 100 includes a core network (also referred to as network cloud), which includes a number of network devices 142 and 144 (e.g., routers and switches). In some embodiments, the network devices 142 and 144 are network nodes relating to FIG. 9 or network device 802 of FIG. 8.

A network performance coordinator 120 may be used to monitor and maintain network performance based on an SLA. The network performance coordinator 120 may be implemented within a network controller (e.g., an SDN controller) or another network device within the core network 104. The network performance coordinator 120 may be hosted in dedicated physical hardware (e.g., a network device), or in virtual machines (VMs) associated with network devices.

The network devices 142 and 144 or network performance coordinator 120 may perform operations such as content filtering, deep packet inspection (DPI), logging/metering/charging/advanced charging, firewall (FW), virus scanning (VS), intrusion detection and prevention (IDP), network address translation (NAT), etc.

2. Network Performance Coordinator

Figure 2:
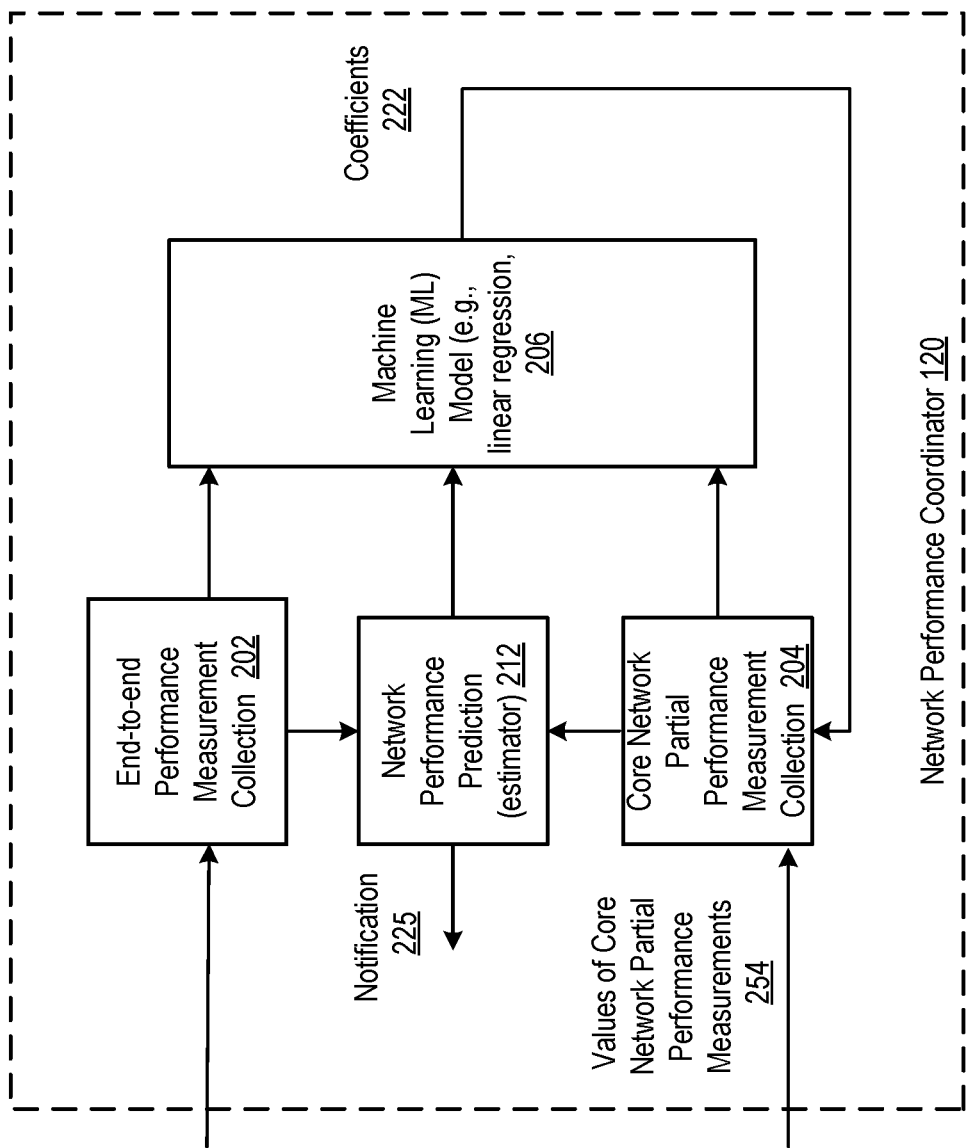
FIG. 2 illustrates operations of a network performance coordinator per some embodiments.

FIG. 2 illustrates a network performance coordinator per some embodiments. The network performance coordinator 120 includes an end-to-end performance measurement collection unit 202, a network performance prediction unit 212, a core network partial performance collection unit 204, and machine learning model unit 206. Some or all of the units may be implemented in hardware (e.g., electric circuits such as processors, ASIC, and/or FPGA), software, or a combination thereof.

An external system may provide the end-to-end performance measurements to the end-to-end performance measurement collection unit 202. The external system may be a tool to be deployed at the terminal device 102 or the services/applications 106, and it may obtain the end-to-end performance measurements for one or more performance indicators (e.g., KPIs including values for packet delay, packet loss, and packet jitter, response time, and percentage/rate of traffic complying with a delay/jitter/loss/response time requirement). The performance indicators may include measurements in various network conditions. Based on the obtained end-to-end performance measurements, the network performance coordinator 120 is aware of the current end-to-end network performance.

The core network partial parameter collection unit 204 obtains values of core network partial performance measurements. These measurements are the ones that the core network may perform without the help of the external system, and it may be collected as the core network is in operation. The values collected by the end-to-end measurement collection unit 202 and core network partial performance measurements may be obtained through either pull (requested by the network performance coordinator 120) or push (initiated by the external system and/or the network devices within the core network). The collected values may be stored in a database, which is stored in the memory of a network device. The collected values are provided to the machine learning model 206.

In one embodiment, the core network partial performance measurement collection unit 204 obtains the values of partial performance measurements that correspond to the end-to-end performance measurements obtained at the end-to-end performance measurement collection unit 202. For example, if the core network partial parameter collection unit 204 collects a partial packet delay measurement within a core network in one network condition (e.g., workload/bandwidth usage at 50%), the end-to-end performance measurement collection unit 202 will collect the corresponding end-to-end packet delay in the same network condition. For another example, if the core network partial parameter collection unit 204 collects a partial packet delay within the core network at one time (e.g., 9:00 AM), the end-to-end performance measurement collection unit 202 will collect the corresponding end-to-end packet delay at the same time (e.g., 9:00 AM). The substantially same network condition and/or time (e.g., within 2% deviation) means the measures by units 202 and 204 are for the same network environment thus they are related.

The machine learning model 206 obtains the measurements from the end-to-end performance measurement collection unit 202 and the core network partial parameter collection unit 204, so that the machine learning model 206 may determine suitable values for its machine learning function(s). The machine learning model 206 may use a variety of models such as linear regression, logistic regression, decision tree, neural networks, support vector machine (SVM), k nearest neighbor (kNN), k-Means, Random Forest, dimensionality reduction algorithms, gradient boosting algorithms, Bayesian network, Genetic algorithm, and federated learning. For network performance estimate, the machine learning model 206 may produce a plurality of coefficients 222 to predict a network performance indicator. The plurality of coefficients 222 may be then applied to subsequent core network partial performance measurements (which the core network may perform on its own) to estimate the value of network performance indicator at the network performance prediction unit 212 at a subsequent time (which the core network can't perform on its own and have to rely on an external system to provide).

The machine learning model 206 may use training data from the end-to-end performance measurement collection unit 202 and core network partial parameter collection 204. For example, the training data may be a set of data vectors, [e0 (partial uplink delay in TCP); e1 (partial downlink in TCP); e2 (partial uplink ICMP ping delay); e3 (partial downlink ICMP ping delay); e4 (partial uplink HTTP response time); e5 (partial downlink HTTP response time)]. This set of training data may be used to compare with the end-to-end delay measured by the external system and determine the parameters for one or more machine learning function(s). For example, one may identify a set of coefficients that will cause the one or more machine learning function(s) to be closed to the measured end-to-end delay measured by the external device. For example, for the linear regression, we aim at finding a plurality of coefficients to estimate a measured end-to-end delay E, $\vec{\theta}=[\theta_0, \theta_1, \theta_2, \theta_3, \theta_4, \theta_5, \theta_6]$, such that the following is true:

$$f(\theta_0+\theta_1*e0+\theta_2*e1+\theta_3*e3+\theta_4*e4+\theta_5*e5+\theta_6*e6) \approx E \quad (1)$$

The coefficients may be obtained after a sizable training data, including sets of data vector and the measure end-to-end delays. Once the plurality of coefficients is obtained, the plurality of coefficients may be applied to the subsequent estimation at the network performance prediction unit 212. The plurality of coefficients may be refined by additional training data of values from the end-to-end performance measurement collection unit 202 and the core network partial parameter collection unit 204. In one embodiment, the refinement of the plurality of coefficients uses a sliding window where the most recent values from the end-to-end performance measurement collection unit 202 and the core network partial parameter collection unit 204 remain, while the earlier data are removed from the model as the earlier data is less relevant, and removing the earlier data makes the machine learning model less computing intensive.

Another example of machine learning is to use neural network, where a machine learning function is the following:

$$a_j^l = \sigma\left(\sum_k w_{jk}^l a_k^{l-1} + b_k^l\right) \quad (2)$$

In formula (2), a is the activation function of the $j^{th}$ neuron in the $l^{th}$ layer, $\sigma$ the function applied, and the coefficients are w (the weights) and b (the biases). The training is to obtain the optimal coefficients for the neural network.

3.1 Machine Learning Estimation

The method to estimate the 5G KPIs with machine learning comprises of two main processes: A—Training and validating a model; and B— Online estimation. These two independent sequences can be described in the following steps:

A—Training and Validating a Machine Learning (ML) Model:
1. The data which is going to be used as the input of the algorithm needs to be gathered for a training phase. It involves the measurements on the UE and on the core network of the different protocol packet exchanges described at section 3.2.
2. The above data need to be preprocessed and tagged to correlate both measurements taken from the UE and core network.
3. The machine learning (ML) algorithm consists of an estimator that will use the above data as input for training in order to give an output of the real latency of the mobile networks.
4. Once the algorithm is trained, the ML model is able to process the measurements taken on the core network to give the final result on real time with a percentage of accuracy. These results are tested with actual test measurements to validate the model.

B—Online Estimation:
5. The model is already validated and deployed on the core network for online latency calculation.
6. With the online latency calculation, the core network can also measure the variances on the network.

3.2 Latency and Response Time Calculation

There are two known methods to identify the latency of a mobile network: TCP RTT and ICMP ping, the former using a connection-oriented protocol and the latter using a connectionless protocol. Embodiments of the invention include calculating latencies from the core network (using the partial information available in the core) as well as the HTTP response time and service response time from the same perspective.

The 5GPP defines how to measure network latency, comprising the measurement of the RTT of an ICMP ping packet from the UE to the access network egress interface. It also recommends doing the testing in ideal conditions, with no errors and with only one UE consuming all the resources from the access network. As defined, this network latency refers to the latency introduced by the (radio) access network.

1. TCP RTT

The mechanism of using TCP Round-Trip-Time (RTT) is widely used to measure KPIs as latency and network anomalies in 3GPP Networks. When we measure the TCP RTT from the core network, we obtain two partials RTTs: the downlink RTT from the core network to the UE (client) and the uplink RTT from the core network to the service (server).

Figure 3:
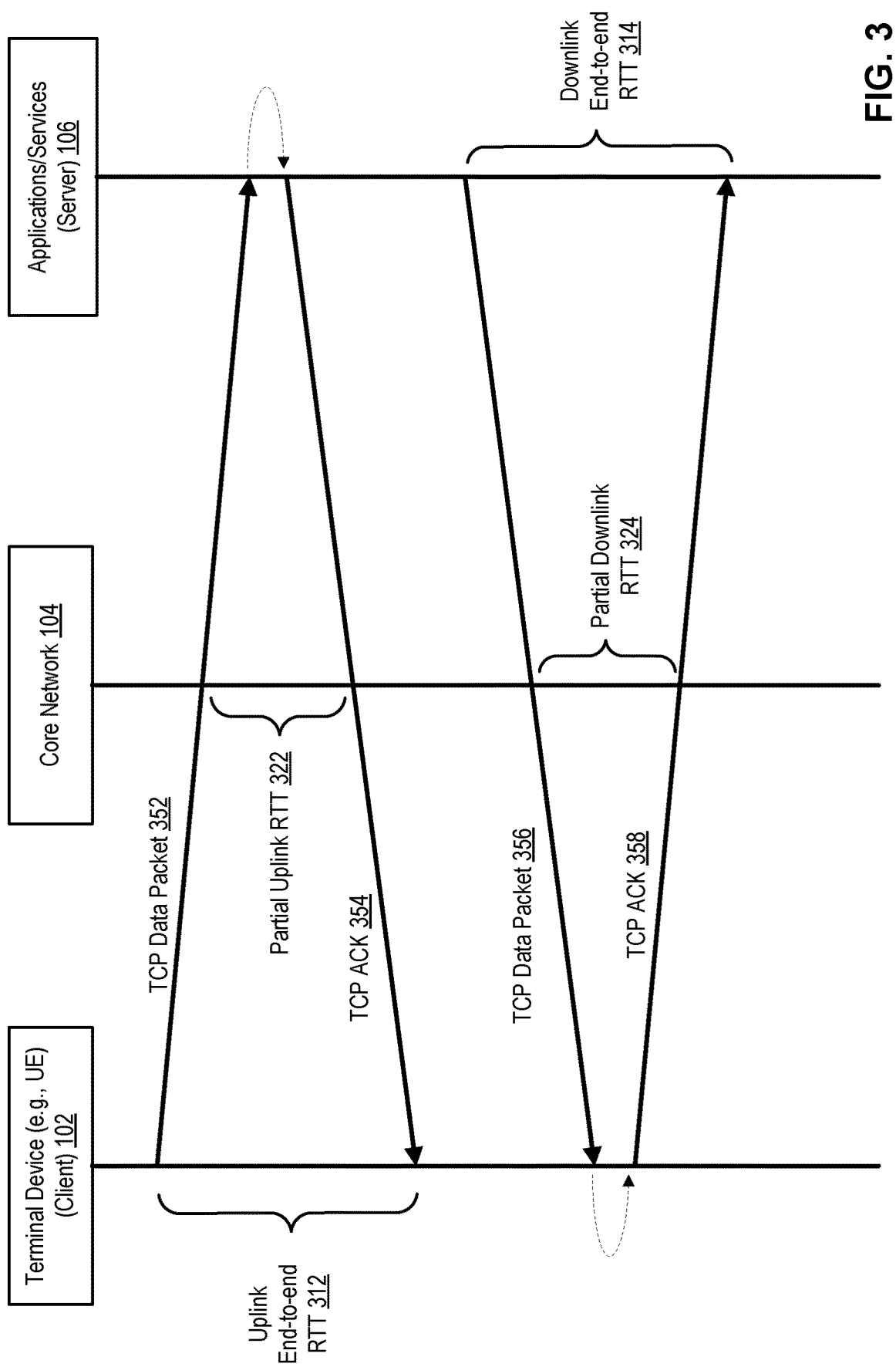
FIG. 3 illustrates estimation of round-trip-time (RTT) per some embodiments.

Embodiments of the invention introduce a new way of calculating/estimating the real RTT by means of machine learning. Some embodiments take into account both RTT measurements (if exists) and the condition of the network. For example, the machine learning model may be used to estimate uplink or downlink RTTS and one-way delay:

A) Both Uplink and Downlink RTTs can be measured from the core network and the whole RTT is calculated with an estimation ML model as shown in FIG. 3. The RTTs are measured using TCP data packets, which include one TCP data packet 352 to be sent from the terminal device 102 through the core network 104 to applications/services 106 provided by a service/application provider (implementing a server in some embodiments), and another TCP data packet 356 in the reverse direction, each causing the recipient to send an acknowledgement packet (TCP ACK 354 and 358 respectively). The core network measures the partial uplink/downlink RTTs 322 and 324, and it obtains (e.g., through an external system) the end-to-end uplink/downlink RTTs 312 and 314. These data are used to train the ML model (e.g., determining the coefficients of the ML function), and the uplink and downlink RTTs in a future time can then be estimated using the ML model and the measured partial uplink/downlink RTTs at the core network.

B) One-way delay is estimated using previous measurements, TCP RTT estimation and network conditions (packet loss, packet size, jitter, TCP windows size and congestion awareness (radio and TCP congestion window estimation)). The estimated one-way delay can be an uplink delay (the end-to-end path from the terminal device 102 to the applications/services 106) or a downlink delay (the end-to-end path from the applications/services 106 to the terminal device 102).

In order to follow the steps as in Section 3.1, the training, validation, and online estimation are described as the following:

1. For the training phase, the measurements of the whole RTT, uplink RTT, downlink RTT, and network condition are collected to use them as train data for both scenarios (offline or online collection).
2. Once the ML model in trained, it is validated to determine if it works as expected with several network conditions.
3. Last step is to deploy the ML model trained and validated on the final product, and the output of the model is the estimation of the real RTT.

2. ICMP Ping

Figure 4:
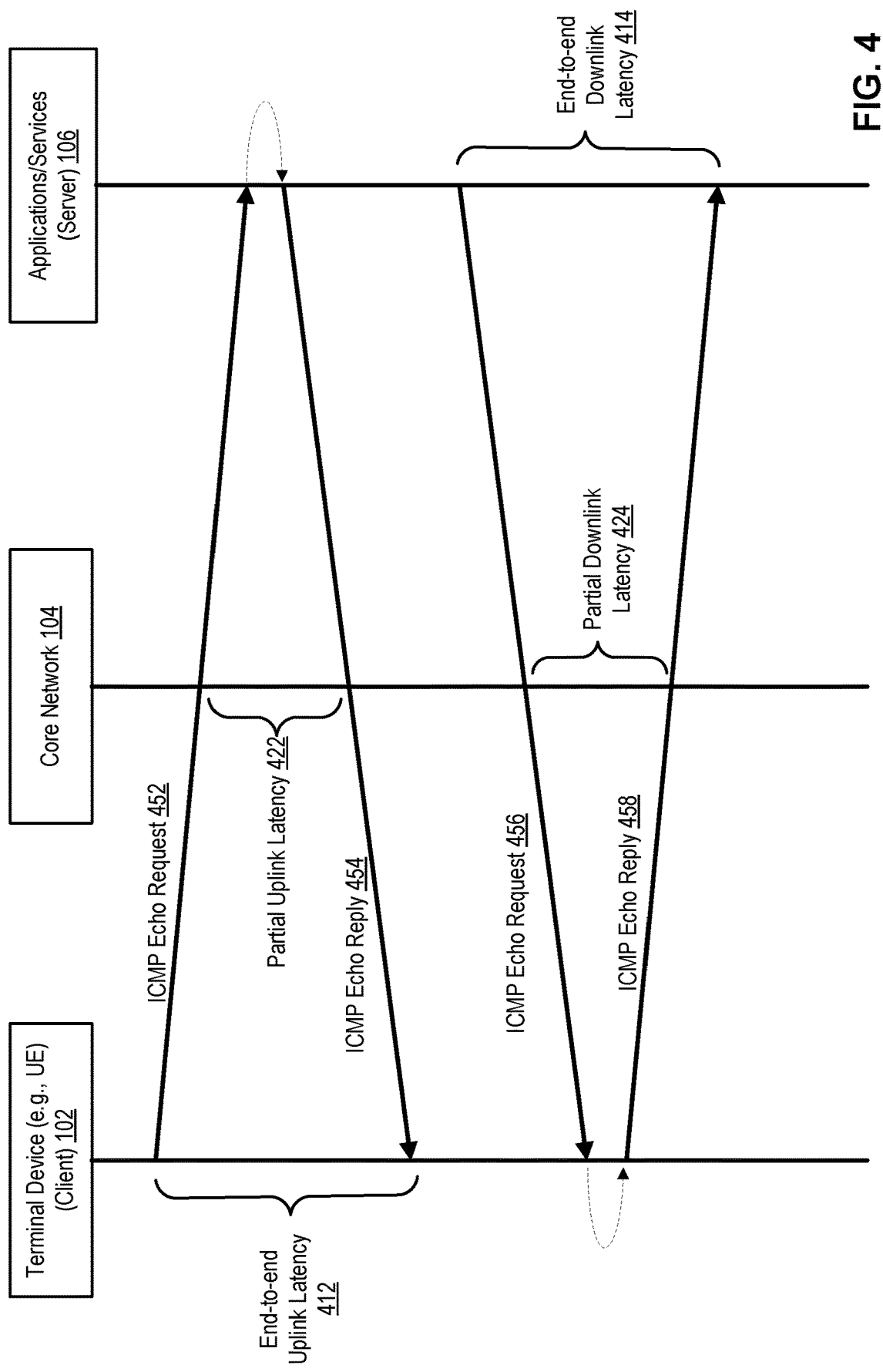
FIG. 4 illustrates estimation of network latency per some embodiments.

The ICMP echo reply message used in a ping has a header field that helps to identify the response of a request. The method of estimating the latency in some embodiments is similar to the solution in TCP RTT one-way delay estimation and is shown in FIG. 4, by measuring partial latencies from the core network 304, i.e., the partial latency of the uplink from the core network 104 to the applications/services 106 (as shown at reference 422) and the partial latency of the downlink from the terminal device 102 to the core network 104 (as shown at reference 424). These two measurements and collected end-to-end uplink and downlink latency (as shown at references 412 and 414) will be used to train a machine learning model, as described in Section 3.1. After it is deployed, it will be able to output the real measurement of the ping measured from the core network 104.

3. HTTP Response Time

To provide more accurate measurements of the latency experienced by the end-user, we propose to estimate the HTTP response time from the core network. The challenge is similar to previous ones, as we have to estimate the response time based on partial information. Additionally, we have to take into account that most of the time HTTP packets are encrypted, using a HTTPS variant, and for that reason we cannot use DPI for classifying the packets.

Figure 5A:
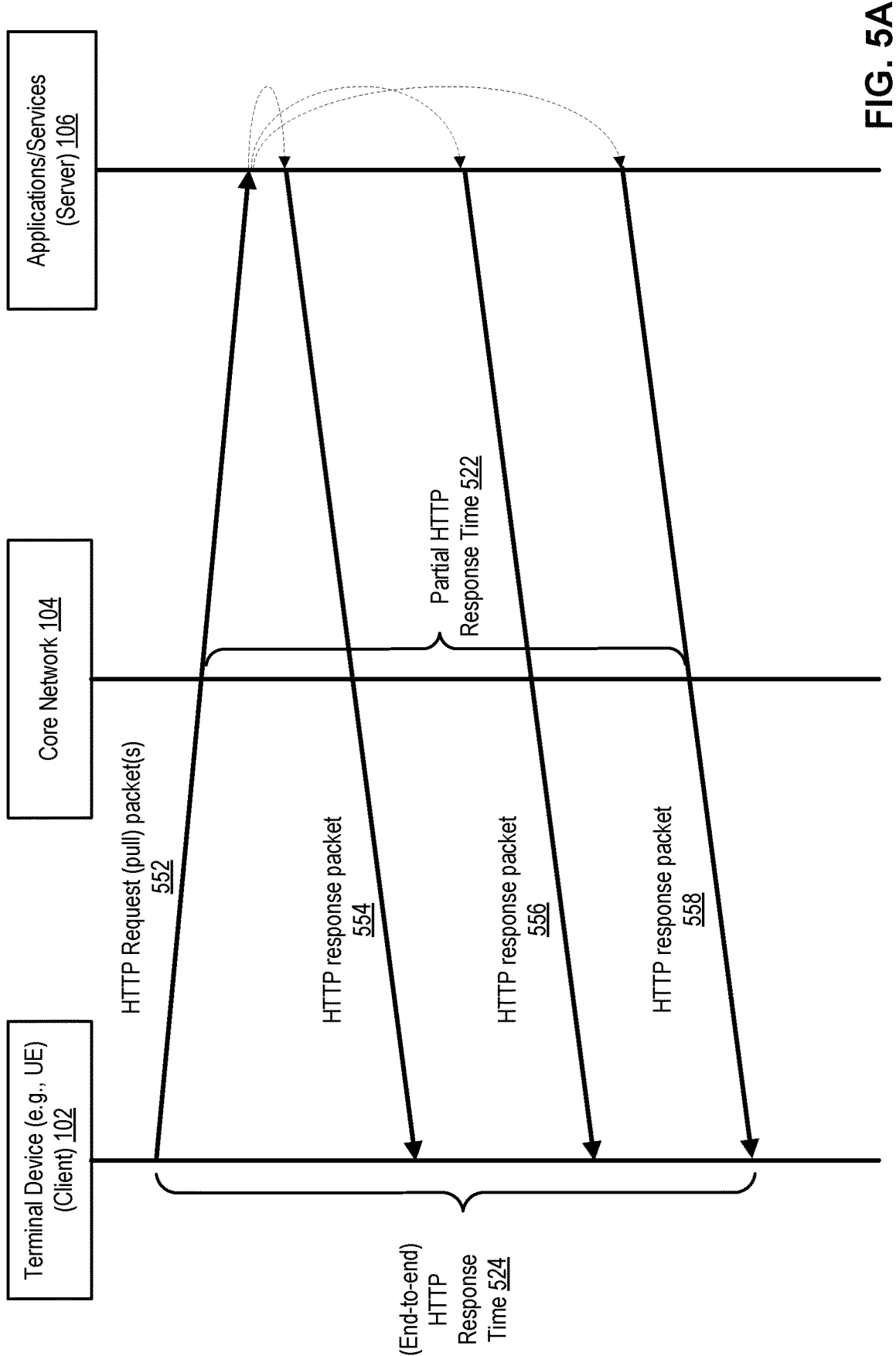
FIGS. 5A-B illustrate estimation of HTTP response time per some embodiments.
Figure 5B:
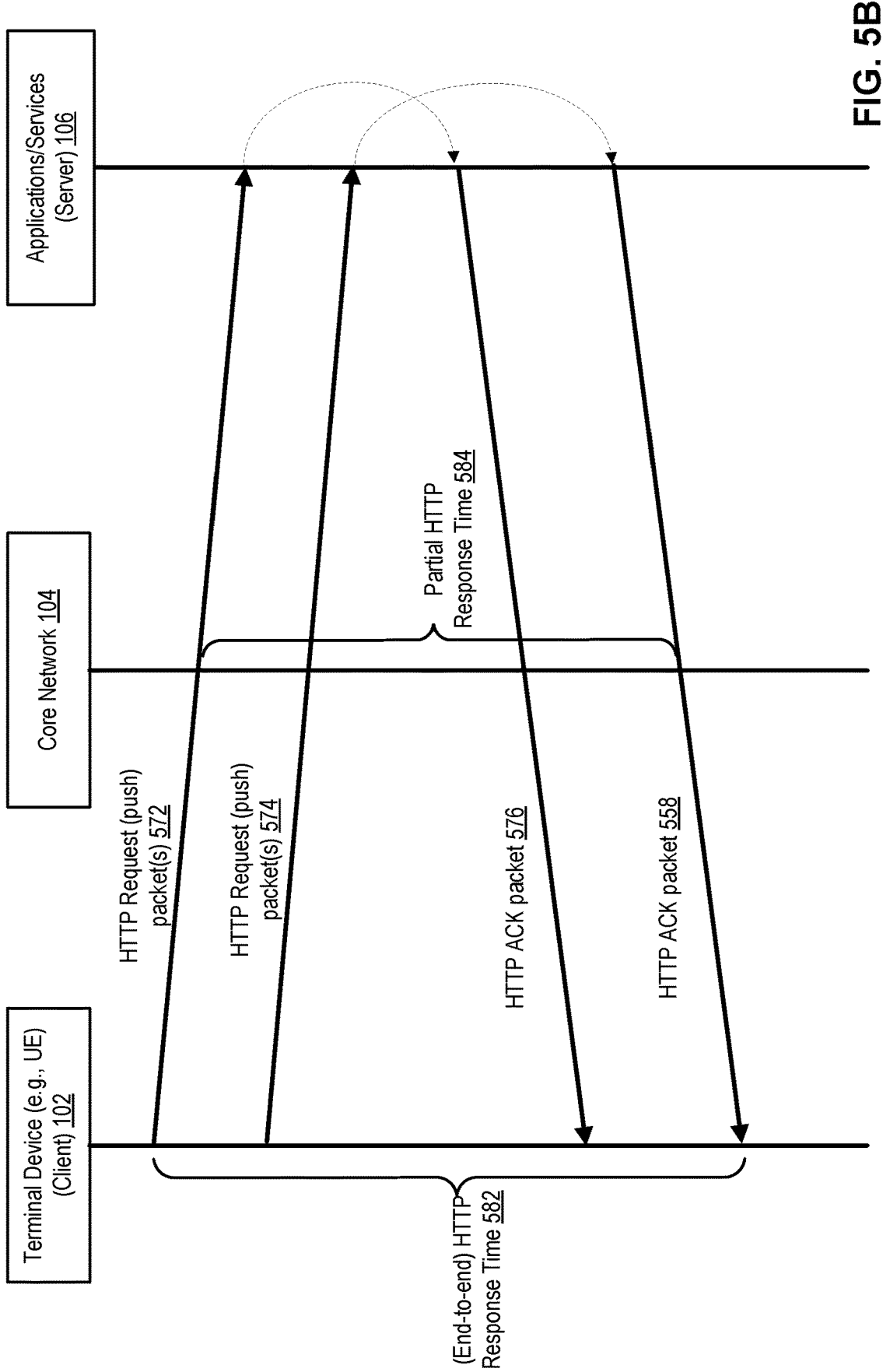

HTTP response time is illustrated in FIGS. 5A and 5B. For the estimation of the HTTP response time, one embodiment uses the chunk detection, which is able to detect a set of HTTPS messages sent in one direction. Using this technique, the procedure is the following per one embodiment:

1. Detect that the client-server messages are based on HTTP protocol, by using existing DPI techniques.
2. Detect the first request chunk (a chunk may include a set of packets such as the HTTP request packets 552).
3. If, after that, a response chunk (e.g., the HTTP response packets 554-558) is detected, the partial HTTP response time is calculated as the interval between the first request packet and the last response packet. FIG. 5A illustrates the partial and end-to-end response time at references 522 and 524 respectively. Alternatively, if there is not a response chunk as shown at FIG. 5B, when the packets from the terminal device 102 are push packets (as shown at references 572 and 574), the partial HTTP response time is the interval between the first packet 572 of the request chunk and the last acknowledge TCP packet 558 from server as shown at reference 584.
4. Using both partial HTTP response time and the type of request, with the network conditions (packet loss, packet size, jitter, TCP windows size and congestion awareness (radio and TCP congestion window estimation)), the real HTTP response time is estimated using a machine learning model. Note that the machine learning model may be trained and/or updated using the measured partial HTTP response time and measured (e.g., by an external system) end-to-end HTTP response time.

4. Service Response Time

Another measurement proposed in the disclosed techniques is the service response time. The rational of this measurement is to offer the best approximation to the end-to-end two-way latency of a communication network experimented by the end-user.

The process is similar to the HTTP response time estimation, but in this case:

The protocol used could be different in each direction;
Could be any protocol, not only HTTP (a connectionless protocol) on top of TCP (a connection-oriented protocol); and
Could be connectionless (also referred to as non-connection-oriented) protocol (e.g., UDP).

This proposal assumes that the agent is trained for each pair of uplink-downlink protocols. Note that connection-oriented protocol and connectionless protocols include variations of UDP such as UDP-Lite, QUIC (Quick UDP Internet Connections) and other transport protocol (OSI Layer 4) such as Multipurpose Transaction Protocol (MTP), Datagram Congestion Control Protocol (DCCP), and the Stream Control Transmission Protocol (SCTP).

Figure 6A:
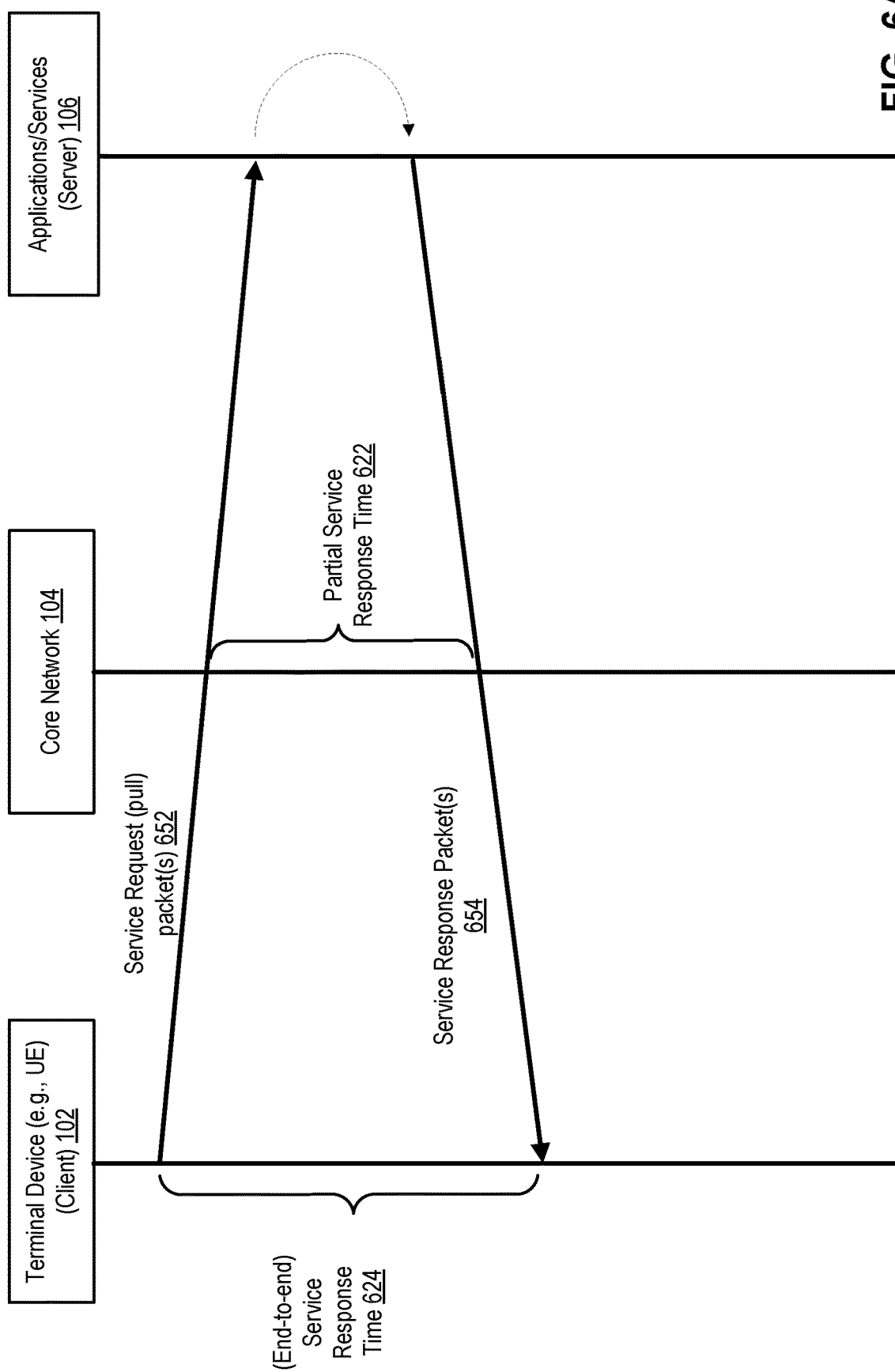
FIGS. 6A-B illustrate estimation of service response time per some embodiments.
Figure 6B:
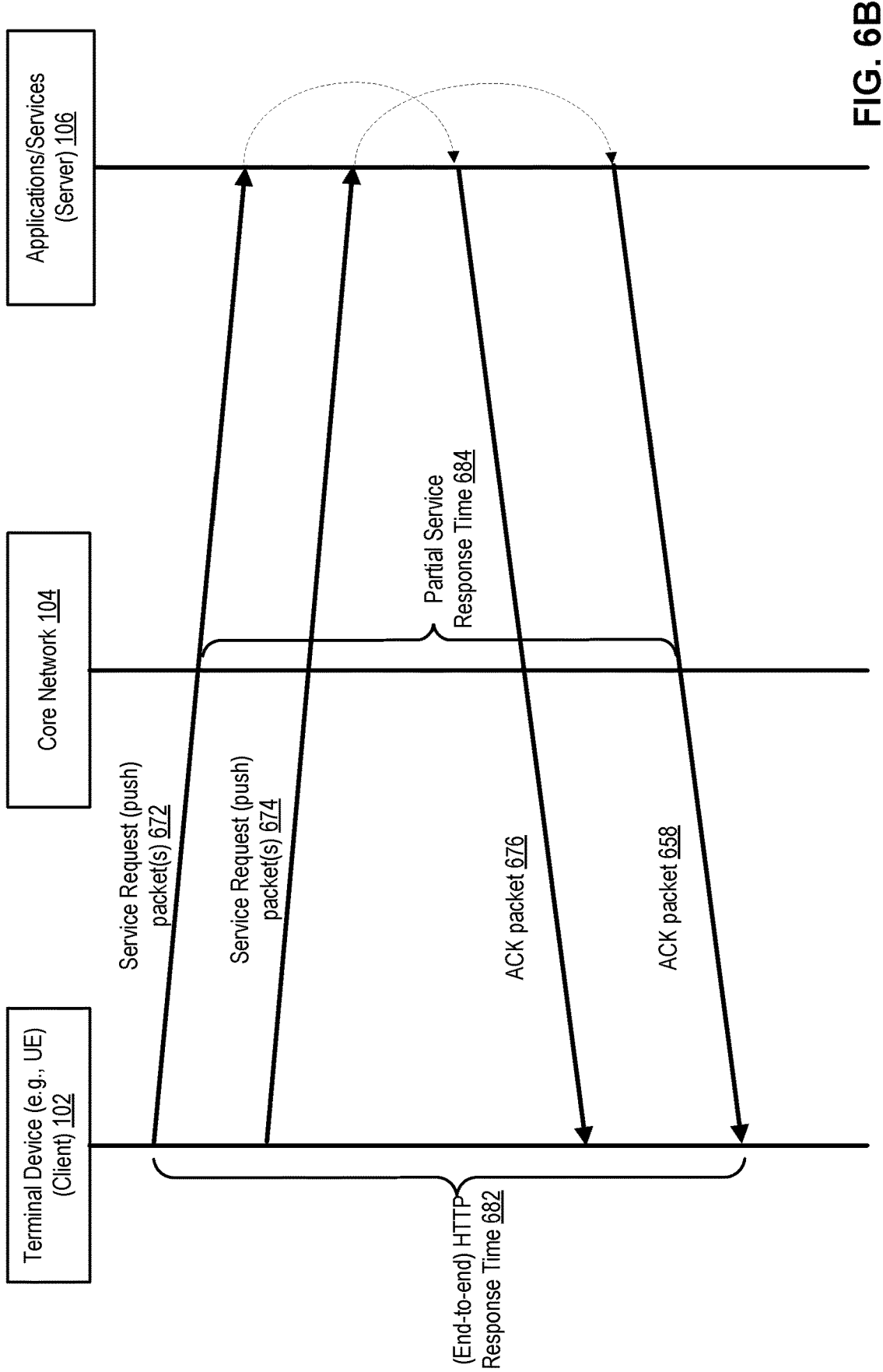

Service Response Time is shown in FIGS. 6A-B. For its estimation we use the chunk detection, which is able to detect a set of protocol messages sent in one direction. Using this technique, the procedure is the following:

1. Detect that the client-server messages are based on a supported protocol, by using existing DPI techniques.
2. Detect the first service request chunk (one or more packets such as the service request packets 652).
3. A response chunk (one or more packets such as service response packets 654) of the downlink protocol is detected.
4. The partial service response time is calculated as the following: a) the interval between the first request packet and the last response packet for downlink no connection-oriented protocols as shown at FIG. 6A; or b) the interval between the first request packet and the last acknowledgement response packet for downlink connection-oriented protocols as shown at FIG. 6B.

5. Using both partial service response time and the type of request, with the network conditions (packet loss, packet size, jitter, TCP windows size and congestion awareness (radio and TCP congestion window estimation)), the real service response time is estimated using a machine learning model.

Note that other than the values of packet delay and response time, other quality of service measurements may also be used as the network performance indicators (KPIs), e.g., the percentage/rate of traffic complying with a delay/response time requirement, the deviation of the agreed upon packet delay/response time).

Figure 7:
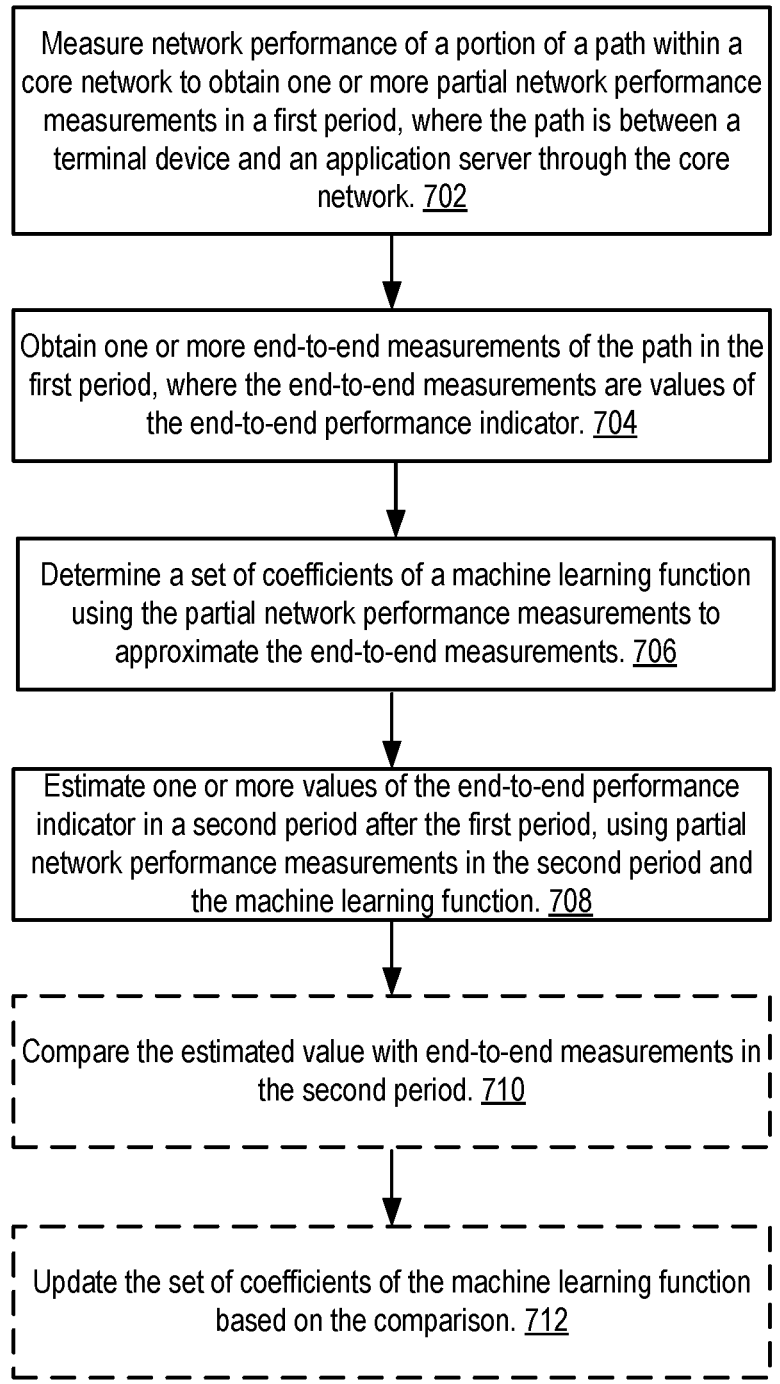
FIG. 7 shows operations of a network performance coordinator per some embodiments.

FIG. 7 shows operations of a network performance coordinator per some embodiments. The method is implemented for estimating end-to-end network performance. The end-to-end network performance measures an end-to-end performance indicator of a path from a terminal device (e.g., terminal device 102) to an application server (providing one or more applications/services, e.g., the applications/services 106), wherein the terminal device is coupled to a core network (e.g., core network 104), wherein the core network measures network performance of a portion of the path.

The method comprises measuring the network performance of the portion of the path to obtain partial network performance measurements in a first period at reference 702. The method also comprises obtaining end-to-end measurements of the path in the first period, wherein the end-to-end measurements are values of the end-to-end performance indicator at reference 704. The method further comprises determining a set of coefficients of a machine learning function using the partial network performance measurements to approximate the end-to-end measurements at reference 706, and estimating one or more values of the end-to-end performance indicator in a second period after the first period, using partial network performance measurements in the second period and the machine learning function 708. In some embodiments, the one or more values are estimated by applying the partial network performance measurements in the second period to the machine learning function, which has the coefficient values determined at step 706.

In one embodiment, the end-to-end performance indicator is a packet end-to-end delay, an end-to-end network response time, or a quality of service measure of the packet end-to-end delay and/or end-to-end network response time. In one embodiment, the partial network performance measurements are one or more types of partial uplink/downlink round trip time (RTT), partial uplink/downlink latency, partial HTTP response time for pull or push packets, and partial service response time. In one embodiment, the partial network performance measurements are measured in different network conditions such as different packet loss, packet sizes, jitters, TCP windows sizes, and congestion awareness (radio and TCP congestion window estimation).

In one embodiment, the partial network performance measurements in the first period include one type of partial network performance measurements in the uplink of the path and another different type of partial network performance measurements in the downlink of the path. In one embodiment, the partial network performance measurements and end-to-end measurements are for a same network condition in the first period.

In one embodiment, the partial network performance measurements are for a two-way path between the terminal device and application server, where the estimated values of the end-to-end performance indicator are for a one-way path between the terminal device and application server, as explained relating to FIG. 3 one-way delay estimation.

In some embodiments, the partial network performance measurements and end-to-end measurements are between a first request packet and a last response packet of a connectionless network protocol (e.g., ICMP, HTTP, or UDP). In some embodiments, the partial network performance measurements and end-to-end measurements are between a first request packet and a last acknowledgement packet of a connection-oriented network protocol (e.g., TCP).

In one embodiment, the method further includes comparing the estimated value with end-to-end measurements in the second period at reference 710 and updating the set of parameters of the machine learning function based on the comparison at reference 712. After the update, the machine learning function may be used for later estimation.

Figure 8:
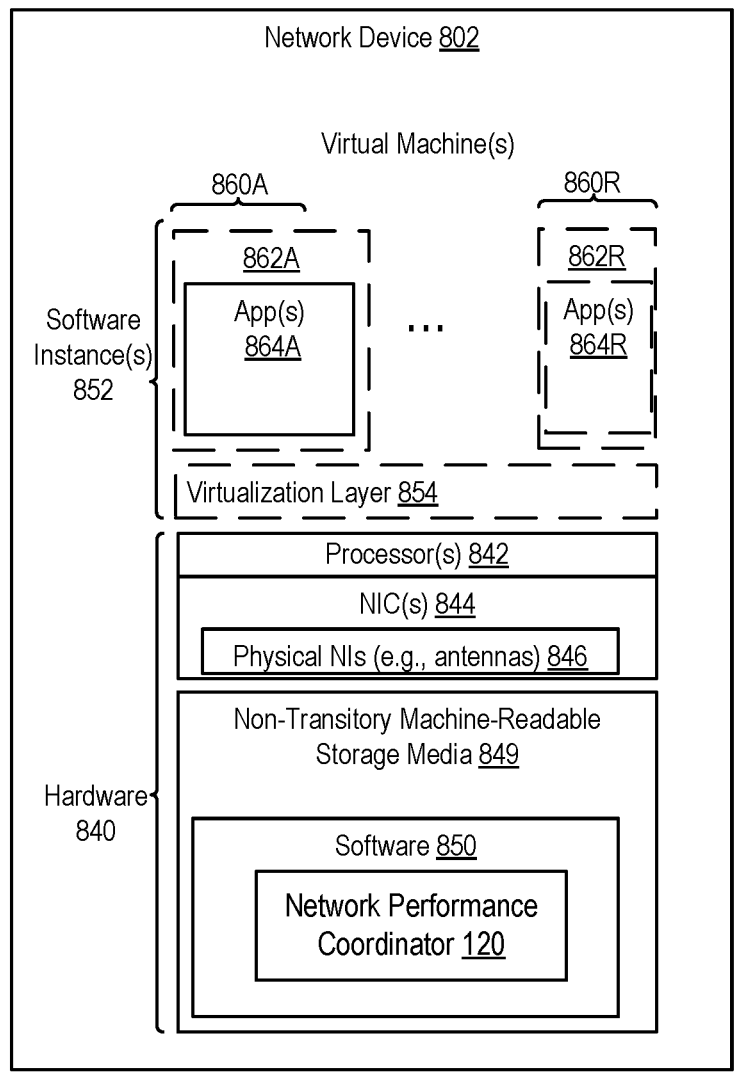
FIG. 8 shows a network device per some embodiments.

FIG. 8 shows a network device per some embodiments. The network device 802 may be implemented using custom application-specific integrated-circuits (ASICs) as processors and a special-purpose operating system (OS), or common off-the-shelf (COTS) processors and a standard OS.

The network device 802 includes hardware 840 comprising a set of one or more processors 842 (which are typically COTS processors or processor cores or ASICs) and physical NIs 846, as well as non-transitory machine-readable storage media 849 having stored therein software 850. During operation, the one or more processors 842 may execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R run on top of a guest operating system within an instance 862A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some, or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels, and sets of applications that are run in different software containers).

The software 850 contains the network performance coordinator 120. The interference coordinator 120 may perform operations in the one or more of exemplary methods/operations, described with reference to earlier figures. The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network device 860A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). The physical network interface 846 may include one or more antenna of the network device 802. An antenna port may or may not correspond to a physical antenna.

Figure 9:
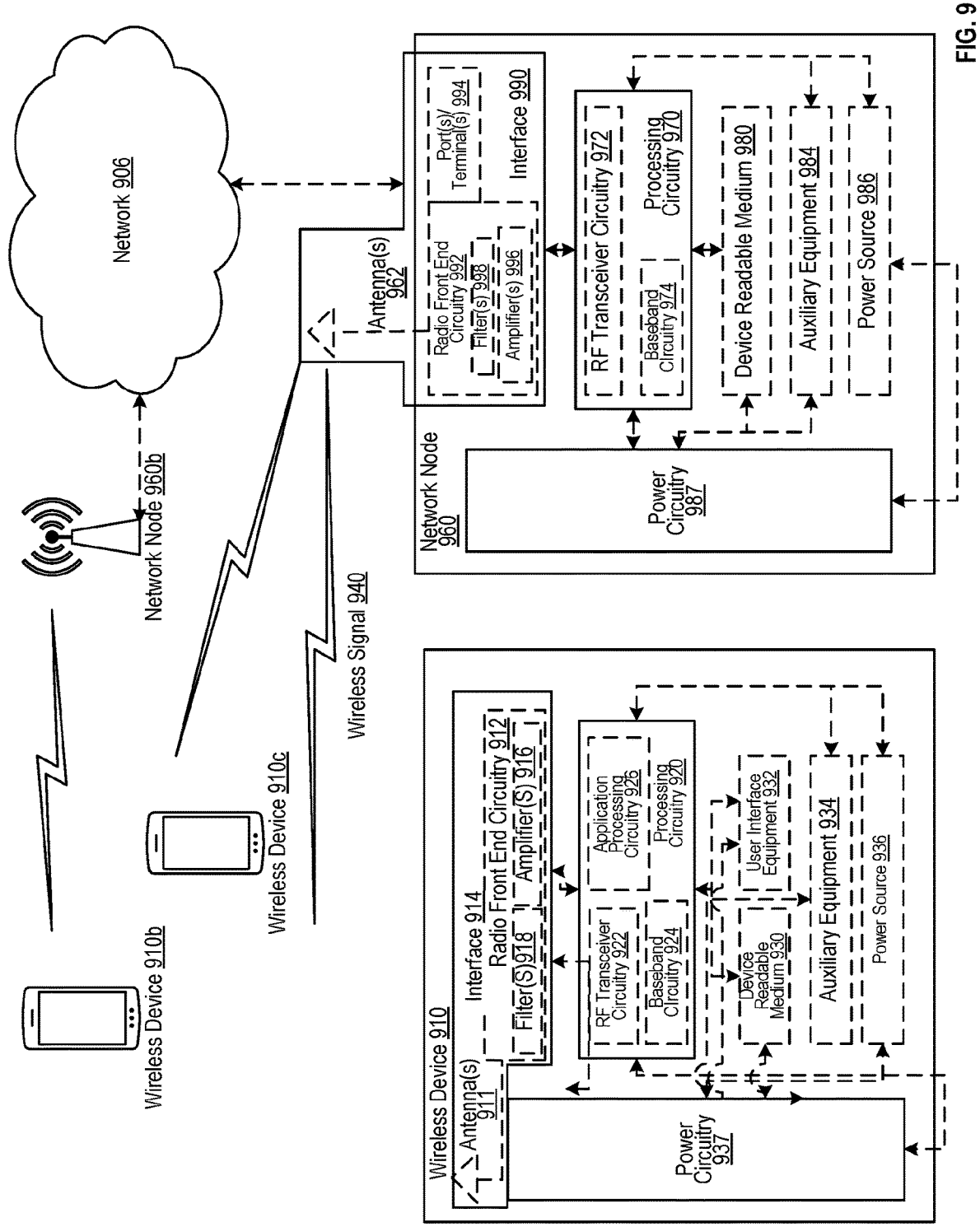
FIG. 9 shows a wireless network per some embodiments.

FIG. 9: A Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960*b*, and WDs 910, 910*b*, and 910*c*. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units.

In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signaling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992; instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, home or personal appliances (e.g. refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data, and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
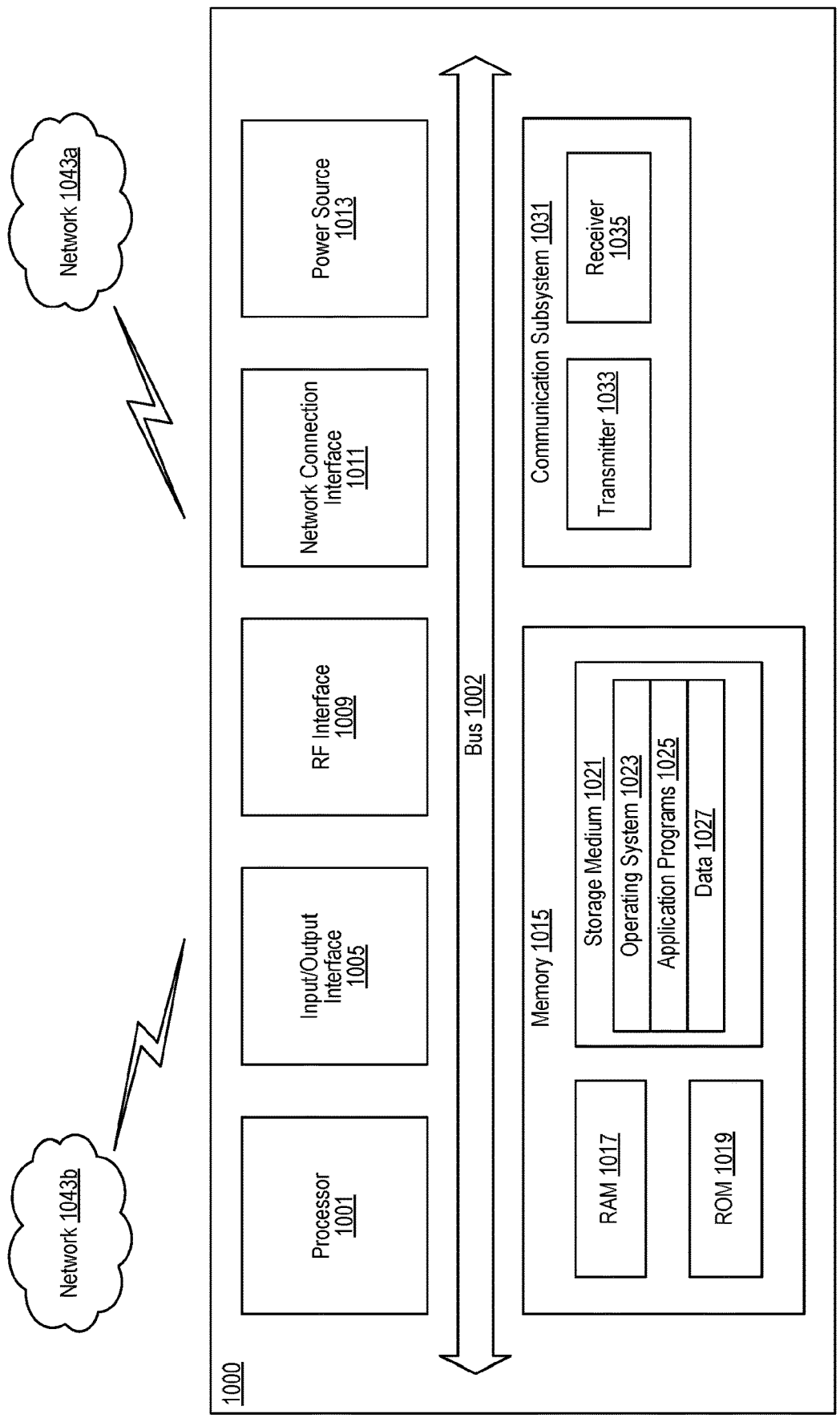
FIG. 10 shows a user equipment (UE) per some embodiments.

FIG. 10: User Equipment in Accordance with Some Embodiments

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1000 may be any UE identified by the $3^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1013, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
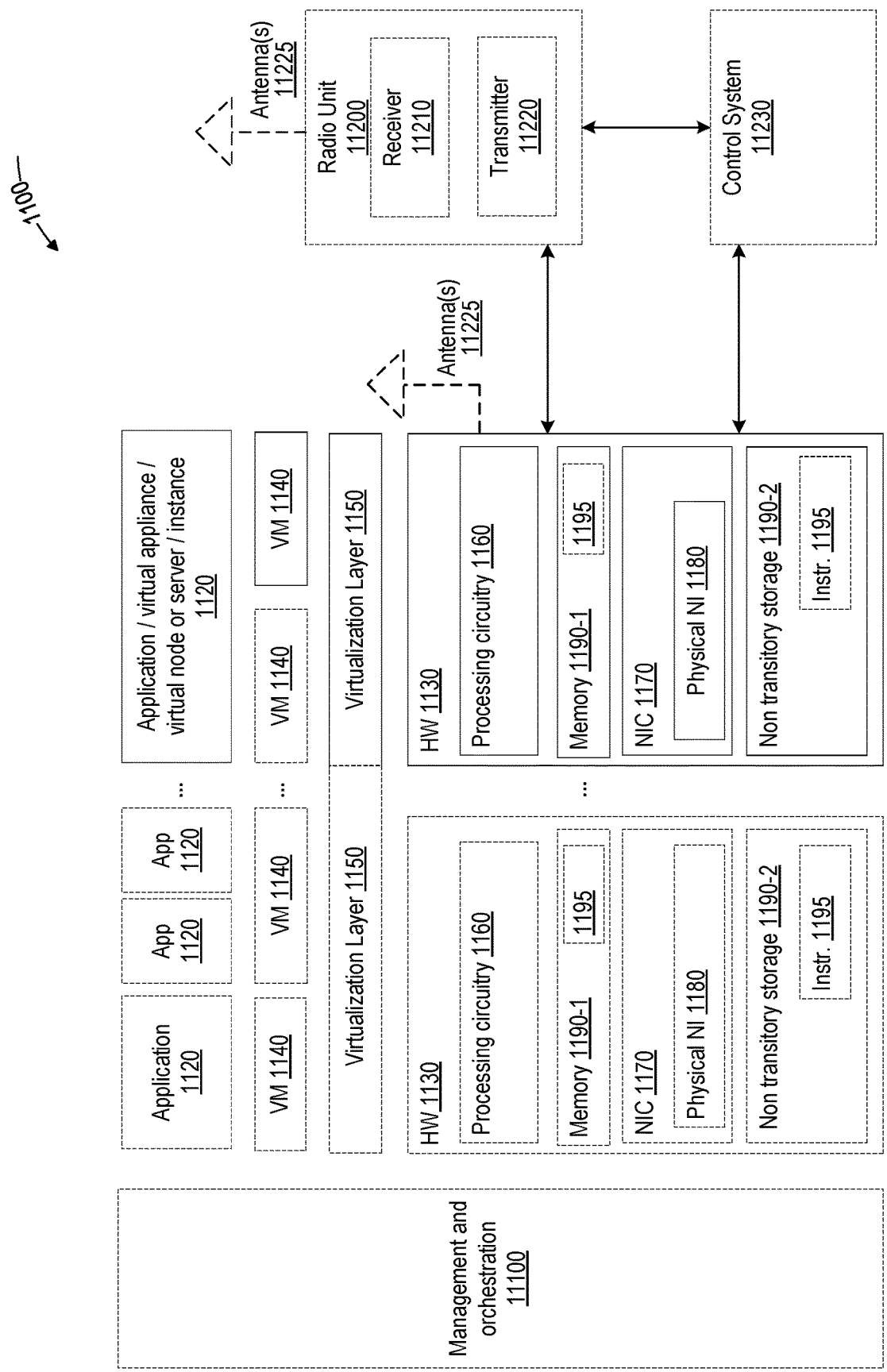
FIG. 11 is a schematic block diagram illustrating a virtualization environment in which functions implemented by some embodiments may be virtualized.

FIG. 11: Virtualization Environment in Accordance with Some Embodiments

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signaling can be effected with the use of control system 11230 which may alternatively be used for communication between the hardware nodes 1130 and radio units 11200.

Figure 12:
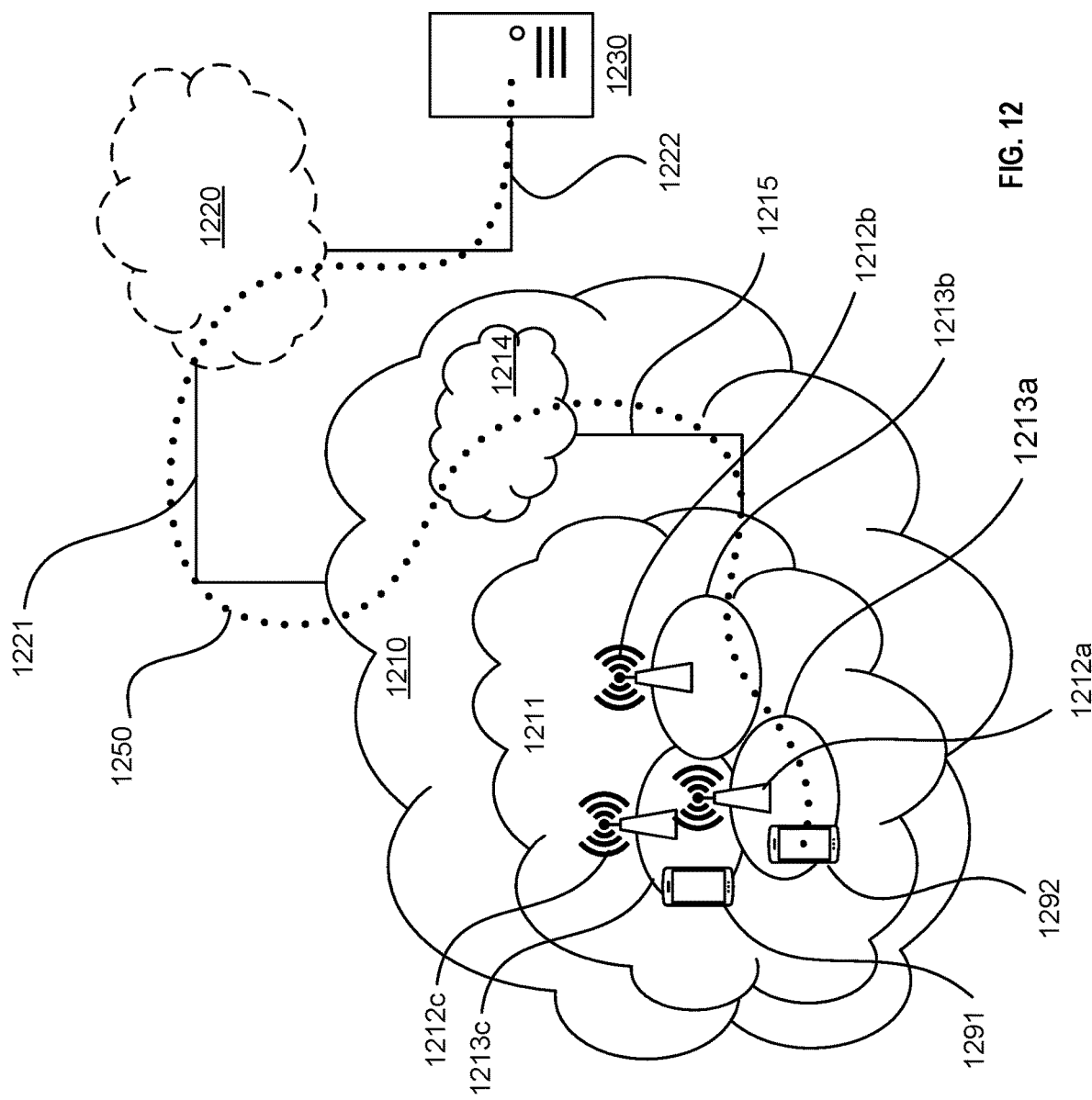
FIG. 12 is a telecommunication network connected via an intermediate network to a host computer per some embodiments.

FIG. 12: Telecommunication Network Connected Via an Intermediate Network to a Host Computer in Accordance with Some Embodiments With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
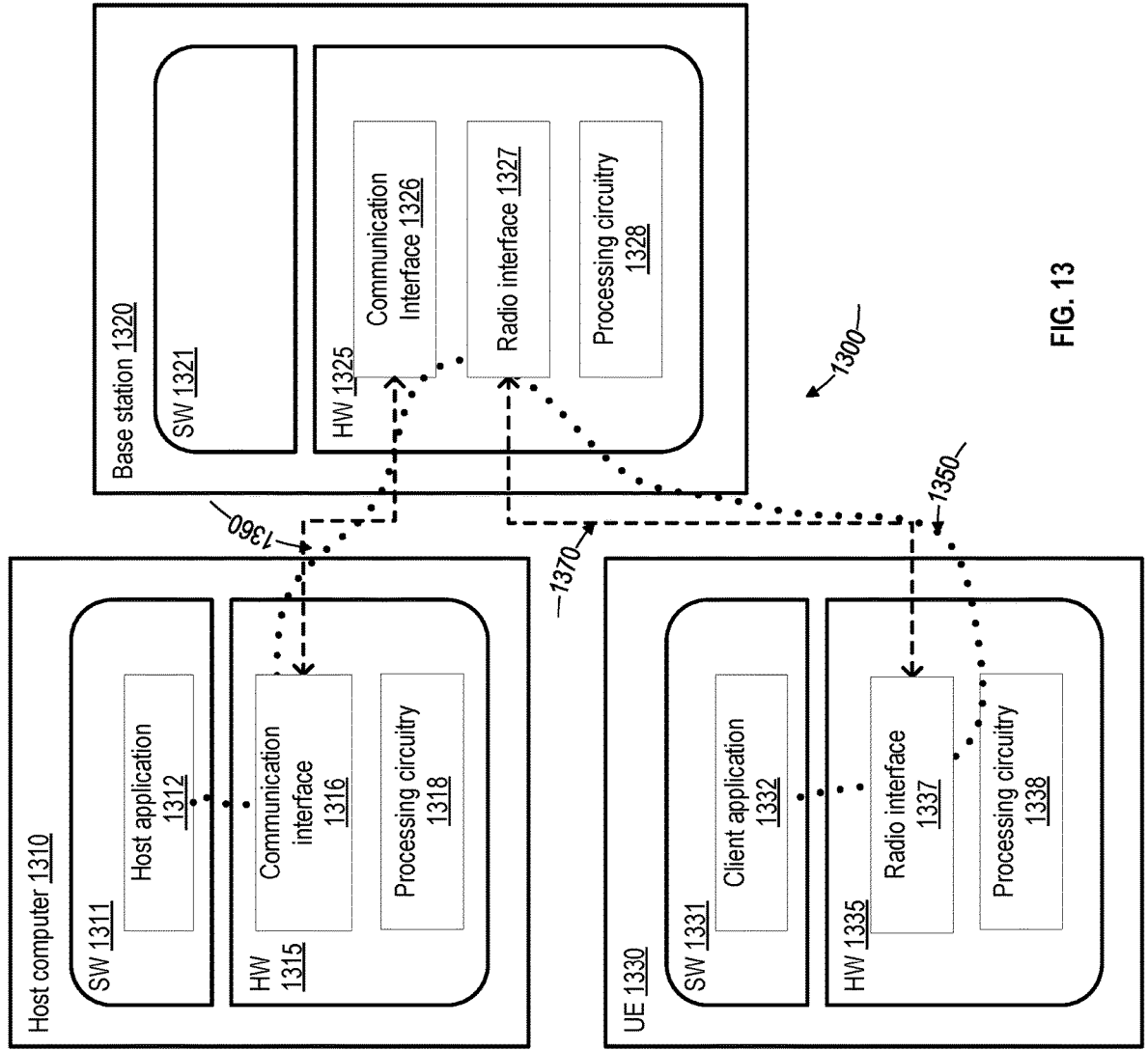
FIG. 13 shows a host computer communicating via a base station with a user equipment over a partially wireless connection per some embodiments.

FIG. 13: Host Computer Communicating Via a Base Station with a User Equipment Over a Partially Wireless Connection in Accordance with Some Embodiments Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the capability of a network operator to measure SLA with customers and thereby provide benefits such as better customer satisfaction and more efficient use of the network resources since the operator may estimate end-to-end network performance based on partial network performance data and one or more machine learning functions.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
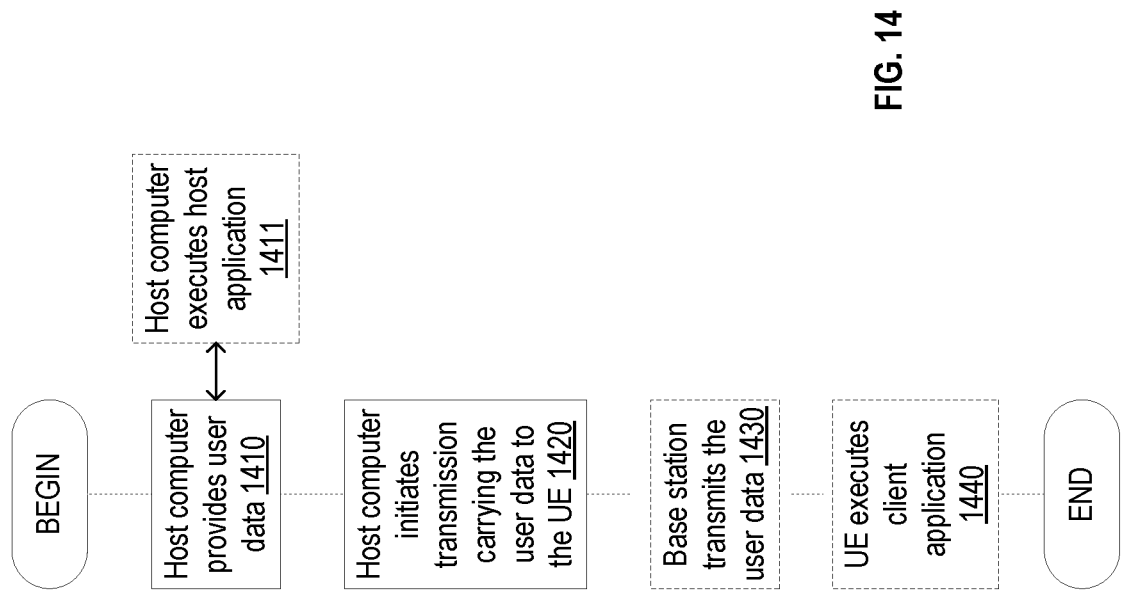
FIG. 14 is a flow diagram showing the operations implemented in a communication system including a host computer, a base station, and a user equipment per some embodiments.

FIG. 14: Methods Implemented in a Communication System Including a Host Computer, a Base Station and a User Equipment in Accordance with Some Embodiments FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
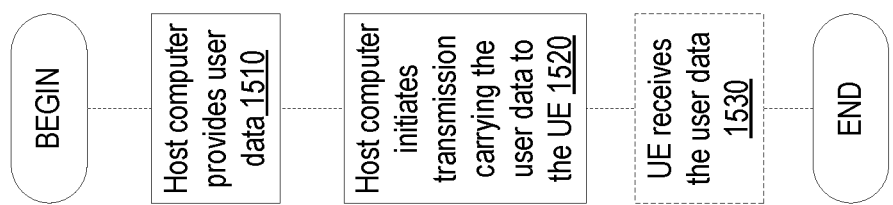
FIG. 15 is a flow diagram showing the operations implemented in a communication system including a host computer, a base station, and a user equipment per other embodiments.

FIG. 15: Methods Implemented in a Communication System Including a Host Computer, a Base Station and a User Equipment in Accordance with Some Embodiments FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
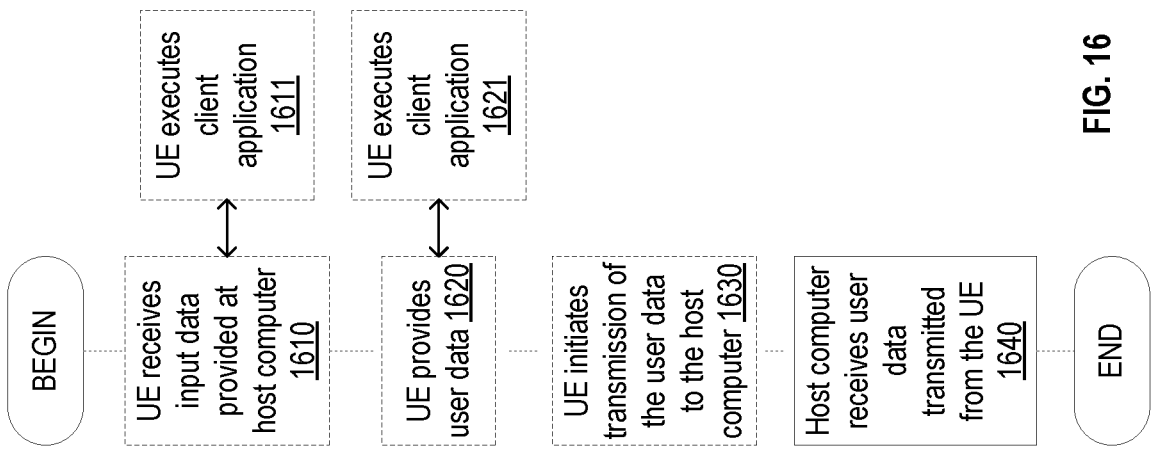
FIG. 16 is a flow diagram showing the operations implemented in a communication system including a host computer, a base station, and a user equipment per further embodiments.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
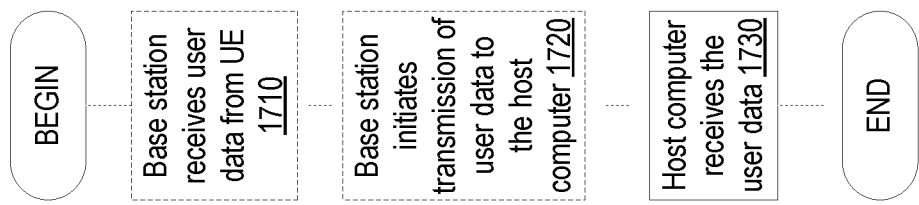
FIG. 17 is a flow diagram showing the operations implemented in a communication system including a host computer, a base station, and a user equipment per further embodiments.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method implemented in a network device for estimating end-to-end network performance, wherein the end-to-end network performance measures an end-toend performance indicator of a path from a terminal device to an application/service, wherein the terminal device is coupled to a core network, wherein the core network measures network performance of a portion of the path, the method comprising:
measuring the network performance of the portion of the path to obtain partial network performance measurements in a first period;
obtaining end-to-end measurements of the path in the first period, wherein the end-to-end measurements are values of the end-to-end performance indicator;
determining a set of parameters of a machine learning function using the partial network performance measurements to approximate the end-to-end measurements; and estimating one or more values of the end-to-end performance indicator using partial network
performance measurements in a second period after the first period.

2. The method of embodiment 1, wherein the end-to-end performance indicator is a packet end-to-end delay, an end-to-end network response time, or a quality of service measure of the packet end-to-end delay and/or end-to-end network response time.

3. The method of embodiment 1, wherein the partial network performance measurements are one or more types of partial uplink/downlink round trip time (RTT), partial uplink/downlink latency, partial HTTP response time for pull or push packets, and partial service response time.

4. The method of embodiment 1, wherein the partial network performance measurements are measured in different network conditions.

5. The method of embodiment 1, wherein the partial network performance measurements in the first period include one type of partial network performance measurements in the uplink of the path and another different type of partial network performance measurements in the downlink of the path.

6. The method of embodiment 1, further comprising:
comparing the estimated value with end-to-end measurements in the second period; and
updating the set of parameters of the machine learning function based on the comparison.

Group B Embodiments

7. A network device for estimating end-to-end network performance, wherein the end-to-end network performance measures an end-to-end performance indicator of a path from a terminal device to an application/service, wherein the terminal device is coupled to a core network, wherein the core network measures network performance of a portion of the path, the network device comprising:
processing circuitry configured to perform any of the steps of any of the Group A embodiments; and
power supply circuitry configured to supply power to the network device.

8. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group A embodiments.

9. The communication system of the previous embodiment further including the base station.

10. The communication system of the previous 2 embodiments, further including the UE, wherein the UE is configured to communicate with the base station.

11. The communication system of the previous 3 embodiments, wherein:
the processing circuitry of the host computer is configured to execute a host application, thereby providing the user data; and
the UE comprises processing circuitry configured to execute a client application associated with the host application.

12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group A embodiments.

13. The method of the previous embodiment, further comprising, at the base station, transmitting the user data.

14. The method of the previous 2 embodiments, wherein the user data is provided at the host computer by executing a host application, the method further comprising, at the UE, executing a client application associated with the host application.

15. The communication system of the previous embodiment, wherein the cellular network further includes a base station configured to communicate with the UE.

16. The communication system of the previous 2 embodiments, wherein:
the processing circuitry of the host computer is configured to execute a host application, thereby providing the user data; and
the UE's processing circuitry is configured to execute a client application associated with the host application.

17. The communication system of the previous 2 embodiments, further including the base station, wherein the base station comprises a radio interface configured to communicate with the UE and a communication interface configured to forward to the host computer the user data carried by a transmission from the UE to the base station.

18. The communication system of the previous 3 embodiments, wherein:
the processing circuitry of the host computer is configured to execute a host application; and
the UE's processing circuitry is configured to execute a client application associated with the host application, thereby providing the user data.

19. The communication system of the previous 4 embodiments, wherein:
the processing circuitry of the host computer is configured to execute a host application, thereby providing request data; and the UE's processing circuitry is configured to execute a client application associated with the host application, thereby providing the user data in response to the request data.

20. A method implemented in a communication system including a host computer, a base station and a user equipment (UE), the method comprising:
at the host computer, receiving user data transmitted to the base station from the UE, wherein the UE performs any of the steps of any of the Group A embodiments.

21. The method of the previous embodiment, further comprising, at the UE, providing the user data to the base station.

22. The method of the previous 2 embodiments, further comprising:
at the UE, executing a client application, thereby providing the user data to be transmitted; and
at the host computer, executing a host application associated with the client application.

23. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group A embodiments.

25. The communication system of the previous embodiment further including the base station.

26. The communication system of the previous 2 embodiments, further including the UE, wherein the UE is configured to communicate with the base station.

27. The communication system of the previous 3 embodiments, wherein:
the processing circuitry of the host computer is configured to execute a host application;
the UE is configured to execute a client application associated with the host application, thereby providing the user data to be received by the host computer.

28. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

29. The method of the previous embodiment, further comprising at the base station, receiving the user data from the UE.

30. The method of the previous 2 embodiments, further comprising at the base station, initiating a transmission of the received user data to the host computer.

What is claimed is:

1. A method implemented in a network device for estimating network performance of a path between a terminal device and an application server through a core network, the method comprising:
measuring network performance of a portion of the path within the core network to obtain one or more partial network performance measurements of the portion of the path in a first period;
obtaining one or more end-to-end measurements of the path in the first period, wherein the end-to-end measurements are values of an end-to-end performance indicator measured outside of the core network;
providing the partial network performance measurements of the portion of the path in the first period and the one or more end-to-end measurements of the path in the first period to a machine learning function to determine a set of coefficients of the machine learning function; and
estimating one or more values of the end-to-end performance indicator in a second period after the first period, by applying partial network performance measurements of the portion of the path in the second period to the machine learning function, the one or more values of the end-to-end performance indicator in the second period indicating the network performance of the path between the terminal device and application server through the core network.

2. The method of claim 1, wherein the end-to-end performance indicator is one or more of a packet end-to-end delay, an end-to-end network response time, a quality of service measure of the packet end-to-end delay, and end-to-end network response time.

3. The method of claim 1, wherein the partial network performance measurements are one or more types of partial uplink/downlink round trip time (RTT), partial uplink/downlink latency, partial HyperText Transfer Protocol (HTTP) response time for pull or push packets, and partial service response time.

4. The method of claim 1, wherein the partial network performance measurements are measured in different network conditions.

5. The method of claim 1, wherein the partial network performance measurements in the first period include one type of partial network performance measurements in an uplink of the path and another different type of partial network performance measurements in a downlink of the path.

6. The method of claim 1, wherein the partial network performance measurements and end-to-end measurements are for a same network condition in the first period.

7. The method of claim 1, wherein the partial network performance measurements are for a two-way path between the terminal device and application server, and wherein the estimated values of the end-to-end performance indicator are for a one-way path between the terminal device and application server.

8. The method of claim 1, wherein the partial network performance measurements and end-to-end measurements are between a first request packet and a last response packet of a connectionless network protocol.

9. The method of claim 1, wherein the partial network performance measurements and end-to-end measurements are between a first request packet and a last acknowledgement packet of a connection-oriented network protocol.

10. The method of claim 1, further comprising:
comparing the estimated value with end-to-end measurements in the second period; and
updating the set of coefficients of the machine learning function based on the comparison.

11. An electronic device, comprising:
a processor and non-transitory machine-readable storage medium storing instructions, which when executed by the processor, are capable of causing the electronic device to perform:
measuring network performance of a portion of a path within a core network to obtain one or more partial network performance measurements of the portion of the path in a first period, wherein the path is between a terminal device and an application server through the core network;
obtaining one or more end-to-end measurements of the path in the first period, wherein the end-to-end measurements are values of an end-to-end performance indicator measured outside of the core network;
providing the partial network performance measurements to approximate the one or more end-to-end measurements of the portion of the path in the first period and the one or more end-to-end measurements of the path in the first period to a machine learning function to determine a set of coefficients of the machine learning function; and
estimating one or more values of the end-to-end performance indicator by applying partial network performance measurements of the portion of path in a second period after the first period to the machine learning function the one or more values of the end-to-end performance indicator in the second period indicating the network performance of the path between the terminal device and application server through the core network.

12. The electronic device of claim 11, wherein the end-to-end performance indicator is one or more of a packet end-to-end delay, an end-to-end network response time, a quality of service measure of the packet end-to-end delay, and end-to-end network response time.

13. The electronic device of claim 11, wherein the partial network performance measurements are one or more types of partial uplink/downlink round trip time (RTT), partial uplink/downlink latency, partial HyperText Transfer Protocol (HTTP) response time for pull or push packets, and partial service response time.

14. The electronic device of claim 11, wherein the partial network performance measurements are measured in different network conditions.

15. The electronic device of claim 11, wherein the partial network performance measurements in the first period include one type of partial network performance measurements in an uplink of the path and another different type of partial network performance measurements in a downlink of the path.

16. A non-transitory computer-readable storage medium that provides instructions that, when executed by a processor of an electronic device, cause the electronic device to perform:
measuring network performance of a portion of a path within a core network to obtain one or more partial network performance measurements of the portion of the path in a first period, wherein the path is between a terminal device and an application server through the core network;
obtaining one or more end-to-end measurements of the path in the first period, wherein the end-to-end measurements are values of an end-to-end performance indicator measured outside of the core network;
providing the partial network performance measurements to approximate the one or more end-to-end measurements of the portion of the path in the first period and the one or more end-to-end measurements of the path in the first period to a machine learning function to determine a set of coefficients of the machine learning function; and
estimating one or more values of the end-to-end performance indicator by applying partial network performance measurements of the portion of the path in a second period after the first period to the machine learning function, the one or more values of the end-to-end performance indicator in the second period indicating the network performance of the path between the terminal device and application server through the core network.

17. The non-transitory computer-readable storage medium of claim 16, wherein the partial network performance measurements are for a two-way path between the terminal device and application server, and wherein the estimated values of the end-to-end performance indicator are for a one-way path between the terminal device and application server.

18. The non-transitory computer-readable storage medium of claim 16, wherein the partial network performance measurements and end-to-end measurements are between a first request packet and a last response packet of a connectionless network protocol.

19. The non-transitory computer-readable storage medium of claim 16, wherein the partial network performance measurements and end-to-end measurements are between a first request packet and a last acknowledgement packet of a connection-oriented network protocol.

20. The non-transitory computer-readable storage medium of claim 16, wherein the electronic device is capable of causing to perform:
comparing the estimated value with end-to-end measurements in the second period; and
updating the set of coefficients of the machine learning function based on the comparison.

* * * * *